US009369853B2

(12) United States Patent
Imai et al.

(10) Patent No.: US 9,369,853 B2
(45) Date of Patent: Jun. 14, 2016

(54) INFORMATION PROCESSING METHOD, TERMINAL APPARATUS AND INFORMATION PROCESSING SYSTEM

(71) Applicant: FUJITSU LIMITED, Kawasaki-shi, Kanagawa (JP)

(72) Inventors: Tomoharu Imai, Kawasaki (JP); Masahiko Murakami, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/661,289

(22) Filed: Mar. 18, 2015

(65) Prior Publication Data

US 2015/0373512 A1 Dec. 24, 2015

(30) Foreign Application Priority Data

Jun. 23, 2014 (JP) ................................ 2014-128486

(51) Int. Cl.
*H04W 4/12* (2009.01)
*H04M 1/725* (2006.01)
*H04W 52/02* (2009.01)

(52) U.S. Cl.
CPC ............ *H04W 4/12* (2013.01); *H04M 1/72525* (2013.01); *H04M 1/72597* (2013.01); *H04W 52/027* (2013.01); *H04W 52/0229* (2013.01)

(58) Field of Classification Search
CPC . H04W 4/12; H04W 52/027; H04W 52/0229; H04M 1/72525; H04M 1/72597
USPC .......................................................... 455/418
See application file for complete search history.

(56) References Cited

U.S. PATENT DOCUMENTS

| 6,574,489 | B1 * | 6/2003 | Uriya | 455/567 |
|---|---|---|---|---|
| 2008/0212753 | A1 * | 9/2008 | Yoshizawa | 379/110.01 |
| 2010/0299597 | A1 * | 11/2010 | Shin et al. | 715/702 |
| 2014/0300760 | A1 * | 10/2014 | Lee | 348/207.1 |
| 2014/0368600 | A1 * | 12/2014 | Do et al. | 348/14.01 |

FOREIGN PATENT DOCUMENTS

| JP | 2005-286530 | 10/2005 |
|---|---|---|
| JP | 2008-167373 | 7/2008 |

* cited by examiner

*Primary Examiner* — Leon Flores
(74) *Attorney, Agent, or Firm* — Oblon, McClelland, Maier & Neustadt, L.L.P.

(57) ABSTRACT

An information processing method executed by a processor included in an information processing apparatus that includes a display device that displays an image and a speaker, the information processing method includes determining, when update of an image displayed on the display device is detected while the information processing apparatus is in a state of voice call, notification sound corresponding to a substance of the update; and outputting the notification sound from the speaker.

14 Claims, 17 Drawing Sheets

FIG. 7

| ACCUMULATED COUNT NUMBER | NUMBER OF UNIT REGIONS | DETERMINATION SUBSTANCE | NOTIFICATION SOUND |
|---|---|---|---|
| 3 OR MORE | 25 OR MORE, 50 OR LESS | RECEPTION NOTIFICATION OF MAIL | "PING" |
| 10 OR MORE | 200 OR MORE | REPRODUCTION OF MOVING PICTURE | "CLACK CLACK" |
| ⋮ | ⋮ | ⋮ | ⋮ |

FIG. 17

| ACCUMULATED COUNT NUMBER | NUMBER OF UNIT REGIONS | OPERATION INFORMATION | DETERMINATION SUBSTANCE | NOTIFICATION SOUND |
|---|---|---|---|---|
| 2 OR MORE | 200 OR MORE | MOUSE DRAG OPERATION OR MOUSE WHEEL OPERATION | BROWSE OPERATION | "BLIP BLOP" |
| 1 OR MORE | 1 OR MORE, 3 OR LESS | KEYBOARD OPERATION | TEXT EDITING | "CLICK CLACK" |
| 10 OR MORE | 200 OR MORE | – | REPRODUCTION OF MOVING PICTURE | "CLACK CLACK" |
| ... | ... | ... | ... | ... |

INFORMATION PROCESSING METHOD, TERMINAL APPARATUS AND INFORMATION PROCESSING SYSTEM

CROSS-REFERENCE TO RELATED APPLICATION

This application is based upon and claims the benefit of priority from the prior Japanese Patent Application No. 2014-128486 filed on Jun. 23, 2014, the entire contents of which are incorporated herein by reference.

FIELD

The embodiments discussed herein are related to a telephone terminal apparatus, an information processing method and an information processing system.

BACKGROUND

A user can operate a touch panel display device or the like to input an operation signal to an information processing unit such as a processor circuit in a portable telephone terminal apparatus such as a smartphone. The information processing unit performs data processing in response to the operation signal to create given image data. Then, the information processing unit causes a display device of the portable telephone terminal apparatus to display an image of the image data.

Incidentally, while the user looks at an image displayed on the display device, the user sometimes uses the telephone function and application software for voice call of the portable telephone terminal apparatus (the telephone function and the application software for voice call are hereinafter referred to collectively as voice call function, and the application software is hereinafter referred to as application). This is, for example, a case in which, in a state in which an image by a particular application is displayed on the display device, a call request is received from a different user or a like case. In order to make it possible for the user to use the voice call function, the portable telephone terminal apparatus includes a speaker and a microphone. It is assumed that, in such a situation as just described, the voice call function is started up while the particular application is in an activated state, and after the voice call is started, while the voice call function operates on the background, the particular application that displays an image operates on the foreground. In this case, in order to listen to voice call sound of the different user issued from the speaker, the user of the portable telephone terminal apparatus would hold the portable telephone terminal apparatus in the proximity of an ear of the user and it is difficult to visually observe the display substance of the display device. Therefore, even if the substance displayed as a result of processing of the particular application changes during the voice call, it may be difficult for the user to recognize the change. As a related art, for example, Japanese Laid-open Patent Publication No. 2008-167373 is disclosed.

In a telephone terminal apparatus including an image display device, within a period within which a user talks using the voice call function the telephone terminal apparatus includes, it may be difficult for the user to visually observe the image display device and to recognize an update of an image occurring within the period. A similar problem occurs also when the user holds the telephone terminal apparatus in the proximity of an ear in order to listen to sound of voice, music or the like reproduced from a speaker in addition to the voice call sound.

SUMMARY

According to an aspect of the invention, an information processing method executed by a processor included in an information processing apparatus that includes a display device that displays an image and a speaker, the information processing method includes determining, when update of an image displayed on the display device is detected while the information processing apparatus is in a state of voice call, notification sound corresponding to a substance of the update; and outputting the notification sound from the speaker.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an estimation method of an update type of an image in the first embodiment;

FIG. 17 is a diagram depicting an estimation method of an update type of an image in the third embodiment.

DESCRIPTION OF EMBODIMENTS

[First Embodiment]

In a first embodiment, a telephone terminal apparatus including an image display device such as a smartphone is provided with a detection unit configured to detect that the telephone terminal apparatus is in use for voice call. If the detection unit detects that the telephone terminal apparatus is in use for voice call, namely, in a state in which the telephone terminal apparatus is in use as a voice call tool, it is supposed that it may be difficult for the user to look at the image display device because the user holds the telephone terminal apparatus in the proximity of an ear of the user. In such a case as just described, when the substance of an image displayed on the image display device is updated, the telephone terminal apparatus notifies the user of a manner of the update of the substance of the image by sound. Consequently, even when it is difficult for the user to confirm the display substance on the image display device by visual observation, the user can recognize from the sound notification that the image has been updated. For example, if a notification that a mail is received is displayed on the screen while the user is talking using the telephone terminal apparatus, then notification sound corresponding to the updating of the screen display is issued from a speaker of the telephone terminal apparatus.

In the present specification, the term "image" is used to include not only a moving picture or a still picture visually representing an event but also an image of a character or characters displayed as text data on the display device. In the present specification, the term "sound" is used to include voice, imitative sound and machine sound.

Figure 1:
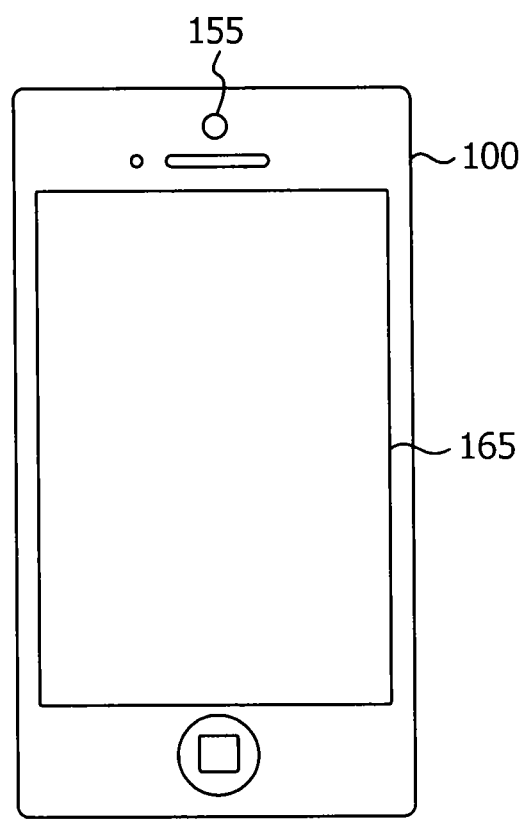
FIG. 1 is a diagram depicting a general configuration of a telephone terminal apparatus.

FIG. 1 is a diagram depicting a general configuration of a telephone terminal apparatus such as a smartphone. Referring to FIG. 1, a telephone terminal apparatus 100 includes an image display unit 165 that is a display device provided on one face of a housing and configured to display an image thereon, and a sound outputting unit 155 in the form of a speaker that outputs voice call sound and so forth. The telephone terminal apparatus 100 can include, as an operation inputting apparatus that accepts an input from a user, a keyboard of a touch panel type in the image display unit 165. Alternatively, the telephone terminal apparatus 100 may include a physical keyboard mounted at some location of the telephone terminal apparatus 100 separately from the image display unit 165. As the telephone terminal apparatus 100, a portable telephone terminal apparatus other than a smartphone, a personal computer (PC) or a personal digital assistant (PDA) of a touch panel type in which a voice call function is provided additionally or a like apparatus may be used.

Figure 2:
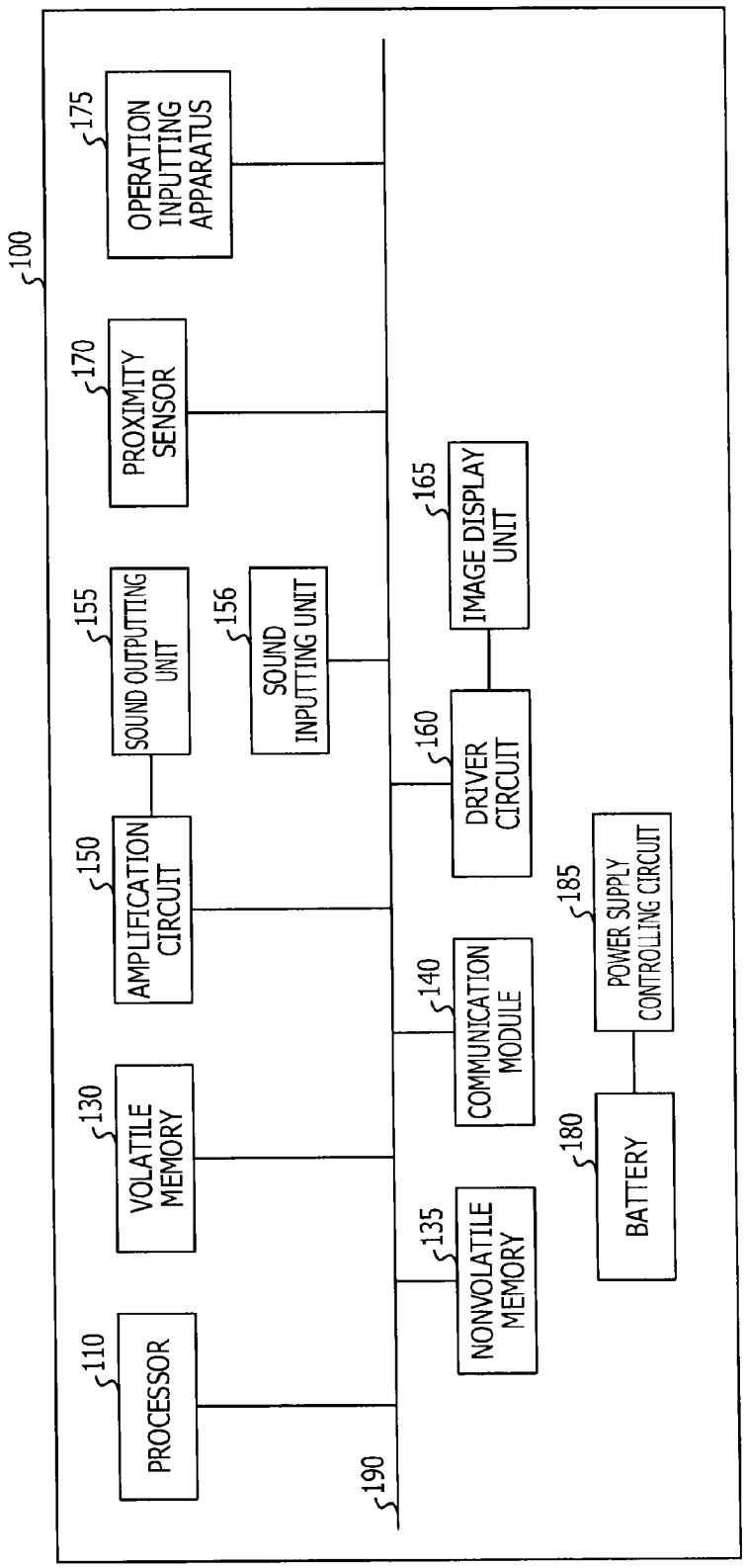
FIG. 2 is a block diagram depicting a hardware configuration of a telephone terminal apparatus according to a first embodiment.

FIG. 2 is a block diagram depicting a hardware configuration of a telephone terminal apparatus. The telephone terminal apparatus depicted in FIG. 2 may be the telephone terminal apparatus 100 depicted in FIG. 1. The telephone terminal apparatus 100 includes a processor 110, a volatile memory 130, a nonvolatile memory 135, a communication module 140, an amplification circuit 150, the sound outputting unit 155, and a sound inputting unit 156. The telephone terminal apparatus 100 further includes a driver circuit 160, the image display unit 165, a proximity sensor 170, an operation inputting apparatus 175, a battery 180, a power supply controlling circuit 185 and a bus 190. The processor 110 performs control of the entire telephone terminal apparatus 100, a generation process of image data and sound data and so forth. The processor 110 is an electronic circuit part such as a central processing unit (CPU), a micro-processing unit (MPU), a digital signal processor (DSP), a field-programmable gate array (FPGA) or the like. The volatile memory 130 stores data and so forth that allow the processor 110 to perform a given process. The volatile memory 130 may function as a frame buffer that stores image data produced by the processor 110. The volatile memory 130 is an electronic circuit part such as a dynamic random access memory (DRAM), a static random access memory (SRAM) or the like. The nonvolatile memory 135 stores a computer program and so forth to be executed by the processor 110. The nonvolatile memory 135 is an electronic circuit part such as a mask read only memory (mask ROM), a programmable ROM (PROM) or a flash memory.

The communication module 140 performs data communication of sound data and image data with a different information processing apparatus such as a terminal apparatus or a server. The data communication may be performed by any of wire communication and wireless communication. Where wireless communication is applied, the communication module 140 includes, for example, a wireless circuit, a baseband circuit, an amplification circuit, an antenna and so forth. A communication module unit that implements the voice call function of the telephone terminal apparatus 100 and a communication module unit that implements different data communication may be provided separately as the communication module 140. The amplification circuit 150 is a circuit that amplifies a signal relating to sound data and transmits the amplified signal to the sound outputting unit 155. The amplification circuit 150 is an electronic circuit part such as a differential amplification circuit. The sound outputting unit 155 outputs sound based on a signal received from the amplification circuit 150. The sound outputting unit 155 is a speaker provided, for example, on the front face of the telephone terminal apparatus 100. The sound inputting unit 156 is an inputting device that inputs sound when the user uses the telephone terminal apparatus 100 as a telephone tool. The sound inputting unit 156 is a microphone provided, for example, on the front face of the telephone terminal apparatus 100.

The driver circuit 160 is a driver circuit that outputs image data stored in the volatile memory 130 and so forth to the image display unit 165. The image display unit 165 is a display device that displays the image data received from the driver circuit 160. The proximity sensor 170 is a sensor that is provided, for example, in the proximity of the sound outputting unit 155 and detects that the telephone terminal apparatus 100 is positioned closely to an ear of the user. The proximity sensor 170 detects a material body existing at a given distance from the proximity sensor 170 and outputs a detection signal. The given distance is, for example, 5 cm. This distance is an exemplary one and is suitably set taking the ease of use of the telephone terminal apparatus 100 by the user into consideration. The proximity sensor 170 is an example of a mechanism that detects that the voice call function of the telephone terminal apparatus 100 is in use by the user. As the proximity sensor 170, a sensor of the capacitor type, ultrasonic type, electromagnetic wave type, induction type, infrared ray type or a like type can be used. As another example of the detection mechanism, a mechanism that uses an optical sensor or an illumination sensor, a gyro or an acceleration sensor or a like sensor to grasp a state in which the telephone terminal apparatus 100 is held or a like state.

The battery 180 is a power supply source for the telephone terminal apparatus 100. The battery 180 charges when the telephone terminal apparatus 100 is coupled to a power supply adapter. The battery 180 discharges when the telephone terminal apparatus 100 is separated from the power supply adapter. The battery 180 supplies sufficient charge to the circuitry in the telephone terminal apparatus 100. The power supply controlling circuit 185 is a control circuit for the battery 180. The power supply controlling circuit 185 performs, for example, control of the charge rate and controls the discharge rate in order to suppress the power dissipation of the telephone terminal apparatus 100 in accordance with an instruction from the processor 110. The power supply controlling circuit 185 is, for example, a direct current-direct current (DC-DC) conversion circuit. The bus 190 interlinks the circuits of the processor 110 and the volatile memory 130 and so forth and functions as a path for data transmission between the circuits.

Figure 3:
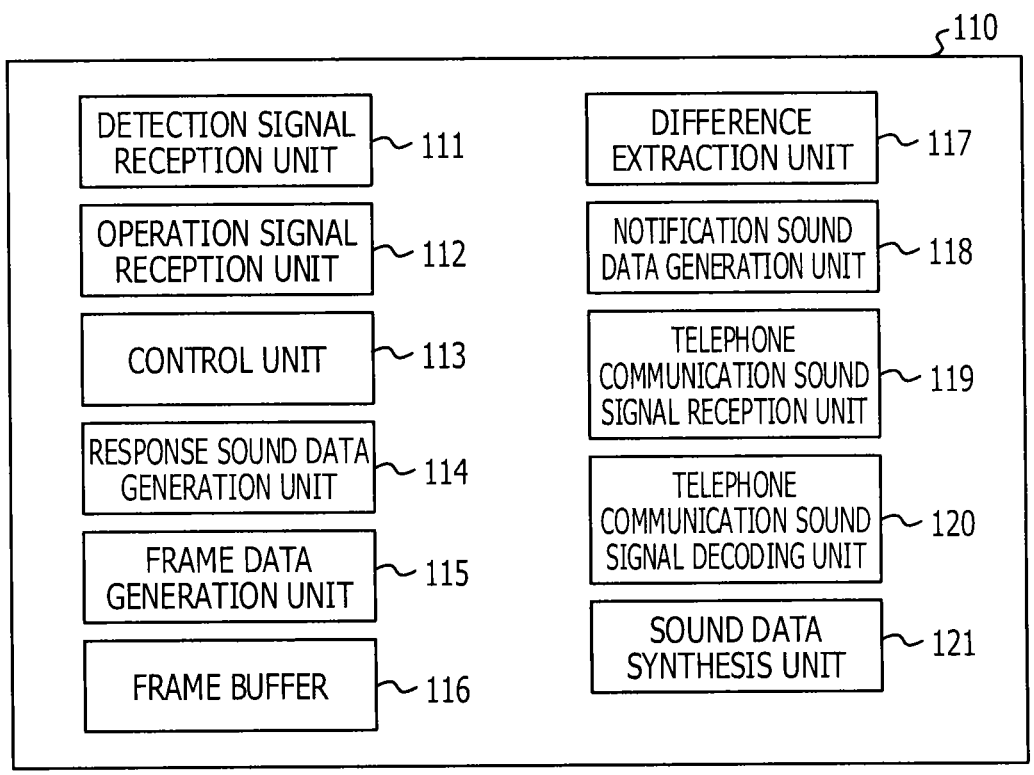
FIG. 3 is a functional block diagram of a processor in the first embodiment.

FIG. 3 is a functional block diagram of a processor. The processor depicted in FIG. 3 may be the processor 110 depicted in FIG. 2. The processor 110 implements the functions depicted in FIG. 3 by executing a given computer program stored in the nonvolatile memory 135 and so forth. The processor 110 functions as a detection signal reception unit 111, an operation signal reception unit 112, a control unit 113, a response sound data generation unit 114, a frame data generation unit 115, a frame buffer 116, and a difference extraction unit 117. The processor 110 further functions as a notification sound data generation unit 118, a voice call sound signal reception unit 119, a voice call sound signal decoding unit 120 and a sound data synthesis unit 121. The detection signal reception unit 111 receives a detection signal from the proximity sensor 170 when the proximity sensor 170 detects a target. The operation signal reception unit 112 receives an operation signal when the user operates the operation inputting apparatus 175 to perform inputting to the telephone terminal apparatus 100. The operation signal reception unit 112 receives, for example, data inputted by the user using the operation inputting apparatus 175 such as a keyboard or an operation signal inputted by a browsing operation by the user in order to access a particular content of a web site being displayed.

The control unit 113 performs a given data process using the response sound data generation unit 114 or the frame data generation unit 115 hereinafter described in response to an operation signal received by the operation signal reception unit 112. The control unit 113 generates frame data to be displayed on the image display unit 165 in response to the operation signal, music data of response sound to be reproduced by the sound outputting unit 155 in response to the operation signal, and so forth. The control unit 113 is implemented, for example, from the Kernel layer.

The response sound data generation unit 114 generates response sound data in accordance with an instruction from the control unit 113 and transmits the generated response sound data to the sound data synthesis unit 121. In the present specification, sound outputted as a response to an operation input from the user inputted to the telephone terminal apparatus 100 is hereinafter referred to as "response sound." Then, sound received from the communication destination by the voice call function of the telephone terminal apparatus 100 is hereinafter referred to as "voice call sound." Further, sound for notifying the user of a manner of image update in response to update of the substance of an image as hereinafter described is hereinafter referred to as "notification sound."

The frame data generation unit 115 generates frame data of an image to be displayed on the image display unit 165 in accordance with an instruction from the control unit 113, for example, a graphics device interface (GDI) command or the like. The frame data generated by the frame data generation unit 115 is stored into the frame buffer 116. The frame data stored in the frame buffer 116 is displayed on the image display unit 165 by the driver circuit 160. The difference extraction unit 117 includes a data buffer. The difference extraction unit 117 acquires frame data inputted to the frame buffer 116 (preceding frame data). Then, the difference extraction unit 117 retains the acquired preceding frame data in the data buffer until frame data of a next frame (next frame data) is inputted to the frame buffer 116. The difference extraction unit 117 extracts a difference (differential) between the preceding frame data retained therein and the next frame data inputted to the frame buffer 116. In particular, the difference extraction unit 117 extracts data corresponding to a portion at which the display substance is updated between one frame and another frame displayed next to the one frame. After extracting the difference, the difference extraction unit 117 overwrites the preceding frame data retained therein with the next frame data retained in the frame buffer 116. The notification sound data generation unit 118 estimates based on the difference extracted by the difference extraction unit 117 what change is indicated by the image substance. Then, the notification sound data generation unit 118 selects notification sound in response to a result of the estimation. Details of a method of estimating a type of update of the image substance based on the difference in the frame data are hereinafter described. The notification sound data generation unit 118 generates notification sound data corresponding to the selected notification sound and transmits the notification sound data to the sound data synthesis unit 121.

When the user communicates with a different telephone terminal apparatus using the voice call function of the telephone terminal apparatus 100, the voice call sound signal reception unit 119 receives a sound signal of voice call sound received from the different telephone terminal apparatus. The voice call sound signal decoding unit 120 decodes the voice call sound signal received by the voice call sound signal reception unit 119 to generate voice call sound data. The voice call sound signal decoding unit 120 transmits the generated voice call sound data to the sound data synthesis unit 121.

The sound data synthesis unit 121 performs synthesis (mixing) of a plurality of pieces of sound data inputted thereto. For example, when response sound data is inputted from the response sound data generation unit 114 and besides voice call sound data is inputted from the voice call sound signal decoding unit 120, the sound data synthesis unit 121 synthesizes these pieces of sound data. For example, if voice call sound data is inputted from the voice call sound signal decoding unit 120 and besides notification sound data is inputted from the notification sound data generation unit 118, then the sound data synthesis unit 121 synthesizes these pieces of sound data. The synthesized sound data is reproduced by the sound outputting unit 155 through the amplification circuit 150. In this case, the user can hear the notification sound in addition to the voice call sound. Even during voice call in which the voice call function is used, the user can recognize the manner of update of the image.

All of the functional blocks depicted in FIG. 3 need not be implemented by the processor 110. For example, the frame buffer 116 may be implemented otherwise using the volatile memory 130 that is an external device to the processor 110. The voice call sound signal reception unit 119 and the voice call sound signal decoding unit 120 may be implemented using a baseband circuit of the communication module 140 or a sound codec circuit for exclusive use. Further, the sound data synthesis unit 121 may be implemented by synthesis of a plurality of analog sound signals using the amplification circuit 150 as an adder amplifier circuit. In particular, voltage signals obtained by analog conversion of a plurality of pieces of sound data such as response sound data are each inputted in parallel to the amplification circuit 150 through resistance elements. In this case, the sound volumes of the sounds can be adjusted suitably by controlling the resistance value of each resistance element.

Figure 4:
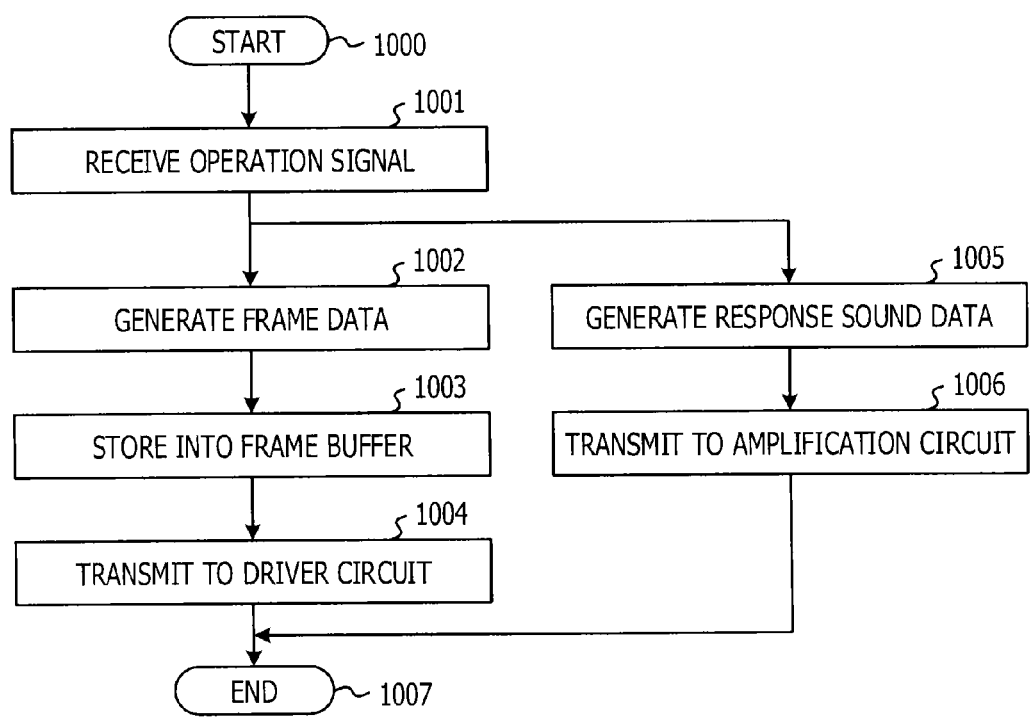
FIG. 4 is a processing flow chart of a processor when an operation signal is received in the first embodiment.

FIG. 4 is a flow chart of a processing executed by a processor when an operation signal reception unit receives an operation signal from a user. The processor and the operation signal reception unit described with reference to FIG. 4 may be the processor 110 depicted in FIG. 2 and the operation signal reception unit 112 depicted in FIG. 3, respectively. Processing is started at step 1000. At step 1001, the operation signal reception unit 112 receives an operation signal from the user. At step 1002, the frame data generation unit 115 generates frame data of an image to be displayed on the image display unit 165 in response to the operation signal. At step 1003, the frame buffer 116 stores the generated frame data. At step 1004, the frame buffer 116 transmits the frame data stored therein to the driver circuit 160.

After the operation signal reception unit 112 receives the operation signal at step 1001, the response sound data generation unit 114 generates response sound data at step 1005. At step 1006, the sound data synthesis unit 121 transmits the generated response sound data to the amplification circuit 150. After steps 1004 and 1006, the processing is ended at step 1007. In the description given above with reference to FIG. 4, a case is assumed in which the processor 110 receiving an operation signal from the user generates response sound data in addition to frame data. However, where the processor 110 generates only frame data but does not generate response sound data, execution of the processes at steps 1005 and 1006 is omitted.

Figure 5:
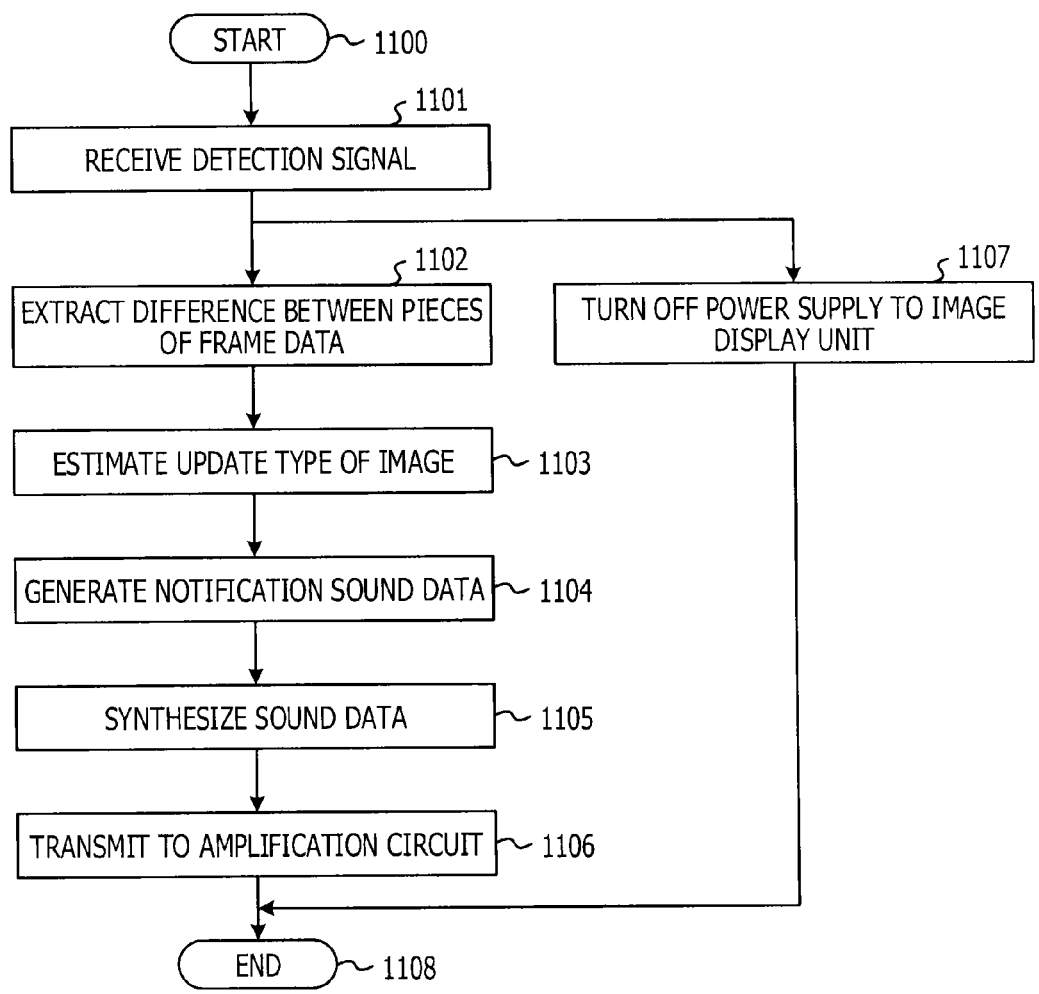
FIG. 5 is a processing flow chart of a processor when a detection signal is received in the first embodiment.

FIG. 5 is a flow chart of processing executed by a processor when a detection signal reception unit receives a detection signal from a communication state detection mechanism such as a proximity sensor. The processor, the detection signal reception unit and the proximity sensor described with reference to FIG. 5 may be the processor 110 depicted in FIG. 2, the detection signal reception unit 111 depicted in FIG. 3 and the proximity sensor 170 depicted in FIG. 3, respectively. Processing is started at step 1100, and the detection signal reception unit 111 receives a detection signal at step 1101. At step 1102, the difference extraction unit 117 extracts, based on frame data corresponding to at least two frames stored in the frame buffer 116, a difference between the pieces of frame data. At step 1103, the notification sound data generation unit 118 estimates a type of update of the image based on the difference between the pieces of frame data extracted by the difference extraction unit 117. As an example of the type of update of the image, that a notification display image that a mail is received is displayed by popup display on the image display unit 165 or that a moving picture is reproduced to successively update the image is available.

At step 1104, the notification sound data generation unit 118 selects notification sound based on the estimated type of update of the image. Then, the notification sound data generation unit 118 generates notification sound data corresponding to the selected notification sound. At step 1105, the sound data synthesis unit 121 synthesizes the notification sound data generated by the notification sound data generation unit 118 with the response sound data generated by the response sound data generation unit 114 or the voice call sound data generated by the voice call sound signal decoding unit 120. At step 1106, the sound data synthesis unit 121 transmits the synthesized sound data to the amplification circuit 150. When none of response sound data and communication sound data is generated, the sound data synthesis unit 121 transmits only the notification sound data to the amplification circuit 150. After step 1101, the control unit 113 turns off the image display unit 165 at step 1107. Consequently, for a period of time within which the user continues to talk using the telephone terminal apparatus 100, power to be used for display of the image display unit 165 can be reduced. As a method for turning off the image display unit 165, a method of stopping the power supply to the image display unit 165 or, where the image display unit 165 is a liquid crystal display device, a method of reducing the illuminance of or turning off the backlight may be applied. In addition to the turning off the image display unit 165, the processing by the driver circuit 160 may be stopped. Step 1107 is not an essentially required process in performing the method of the present embodiment but is suitably performed as one of countermeasures for power management of the telephone terminal apparatus 100. However, even where the power supply to the image display unit 165 or the driver circuit 160 is turned off, processing relating to image data such as, for example, processing for generation of frame data or for extraction of a difference between pieces of frame data is executed continuously. This is because it is made possible by the processes for the notification sound data generation unit 118 to recognize that updating of an image has occurred and notify the user of such updating.

The synthesis of a plurality of pieces of data performed by the sound data synthesis unit 121 may be performed such that sounds of the sound data are reproduced simultaneously in an overlapping relationship with each other or may be performed in a time division fashion such that the sounds are reproduced alternately. The sound data synthesis unit 121 may perform weighting in sound volume for each piece of sound data so that the pieces of sound data may be outputted in individually suitable sound volumes. For example, the sound volumes may be controlled so that the sound volume of the response sound or the notification sound is smaller than the sound volume of the voice call sound in order that the communication sound can be heard readily.

Figure 6:
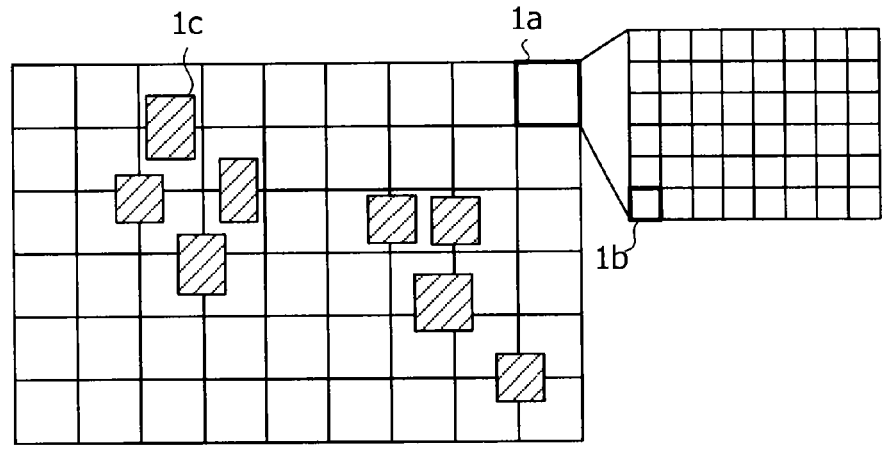
FIG. 6A is a diagram illustrating an estimation method of an update type of an image in the first embodiment.
FIG. 6B is another diagram illustrating an estimation method of an update type of an image in the first embodiment.
FIG. 6C is a further diagram illustrating an estimation method of an update type of an image in the first embodiment.

FIGS. 6A, 6B and 6C are diagrams illustrating a method for selecting a type of update of an image based on frame data stored in a frame buffer. The frame buffer described with reference to FIGS. 6A, 6B and 6C may be the frame buffer 116 depicted in FIG. 3. Extraction of difference data between frames by the difference extraction unit 117 is performed using a map in which the frames are divided into a plurality of unit regions disposed in a mesh form. FIG. 6A illustrates a manner in which a frame is divided into a plurality of unit regions disposed in a mesh form. Although a frame is divided into unit regions, for example, of 16 rows and 16 columns, part of the unit regions, namely, a unit region group of 6 rows and 9 columns, is depicted in FIG. 6A. Each unit region includes a plurality of picture elements (pixels). One unit region includes pixels disposed, for example, in 8 rows and 8 columns. Reference symbol 1a in FIG. 6A denotes a unit region; 1b a pixel; and 1c an update rectangular region. In FIG. 6A, a plurality of rectangular regions indicated by slanting lines denote regions in which the display substance differs between two frames displayed successively. In the present specification, each of the rectangular regions is referred to as update rectangular region. That a region in which the display substance is updated has a rectangular shape is not the essence of the present embodiment, and the update region of the display substance may have a shape other than the rectangular shape.

The difference extraction unit 117 counts, for each unit region, the number of update rectangular regions the unit region overlaps with. FIG. 6B depicts a count number for each unit region in the example depicted in FIG. 6A. In any unit region that does not overlap with any of the update rectangular regions, the count number is "0." The count number in a unit region that overlaps with a plurality of, for example, two, update rectangular regions is "2."

Then, an action of counting the number of overlaps with update rectangular regions for each unit region is executed for a fixed period of time, for example, for one second. Then, if frame update is performed by a plural number of times during the execution of the action, then the counted numbers are cumulatively added. Where 30 frames are displayed for one second, counting results for 30 times of counting are cumulatively added. FIG. 6C exemplifies the count number for each unit region cumulatively added for a fixed period of time.

Now, a method of estimating a type of update of an image to be performed by a notification sound data generation unit depicted in FIG. 7 is described based on the results depicted in FIG. 6C. The notification sound data generation unit described with reference to FIG. 7 may be the notification sound data generation unit 118 depicted in FIG. 3. FIG. 7 is a table exemplifying a relationship among an accumulated count number for each unit region, the number of unit regions in which the accumulated count number is equal to or greater than a given value, the substance of estimation of a type and a type of notification sound. In an example indicated in the first column of the table, where the number of unit regions that satisfy a condition that the accumulated count number is "equal to or greater than 3" is "equal to or greater than 25 and equal to or smaller than 50," it is determined that the type of update of the image is, for example, a mail reception notification message displayed in popup on the image display unit 165 based on reception of a mail. This is based on a decision that the range in which the data substance is updated is limited to a fixed region of the frame data. In the example depicted in FIG. 6C, since 28 unit regions indicate an accumulated count number equal to or greater than "3," the condition described above is satisfied. Thus, as the notification sound, machine sound of "ping" is selected.

In an example depicted in the second column of the table in FIG. 7, where the number of unit regions that satisfy a condition that the accumulated count number is "equal to or greater than 10" is "equal to or greater than 200," it is determined that the type of update of the image is, for example, update of successive frames based on reproduction of a moving picture. This is based on a decision that the range of the frame data in which the data substance is updated is comparatively wide and also the number of updates is comparatively great. In this case, machine sound of "clack clack" depicting a manner in which a projector operates is selected as the notification sound. All notification sounds depicted in FIG. 7 are exemplary, but some other sounds may be used instead.

In this manner, by determining an estimation type in advance using the relation between an accumulated count number and a unit region number, an update type of an image can be estimated based on data relating to differences acquired by the difference extraction unit 117.

Figure 8:
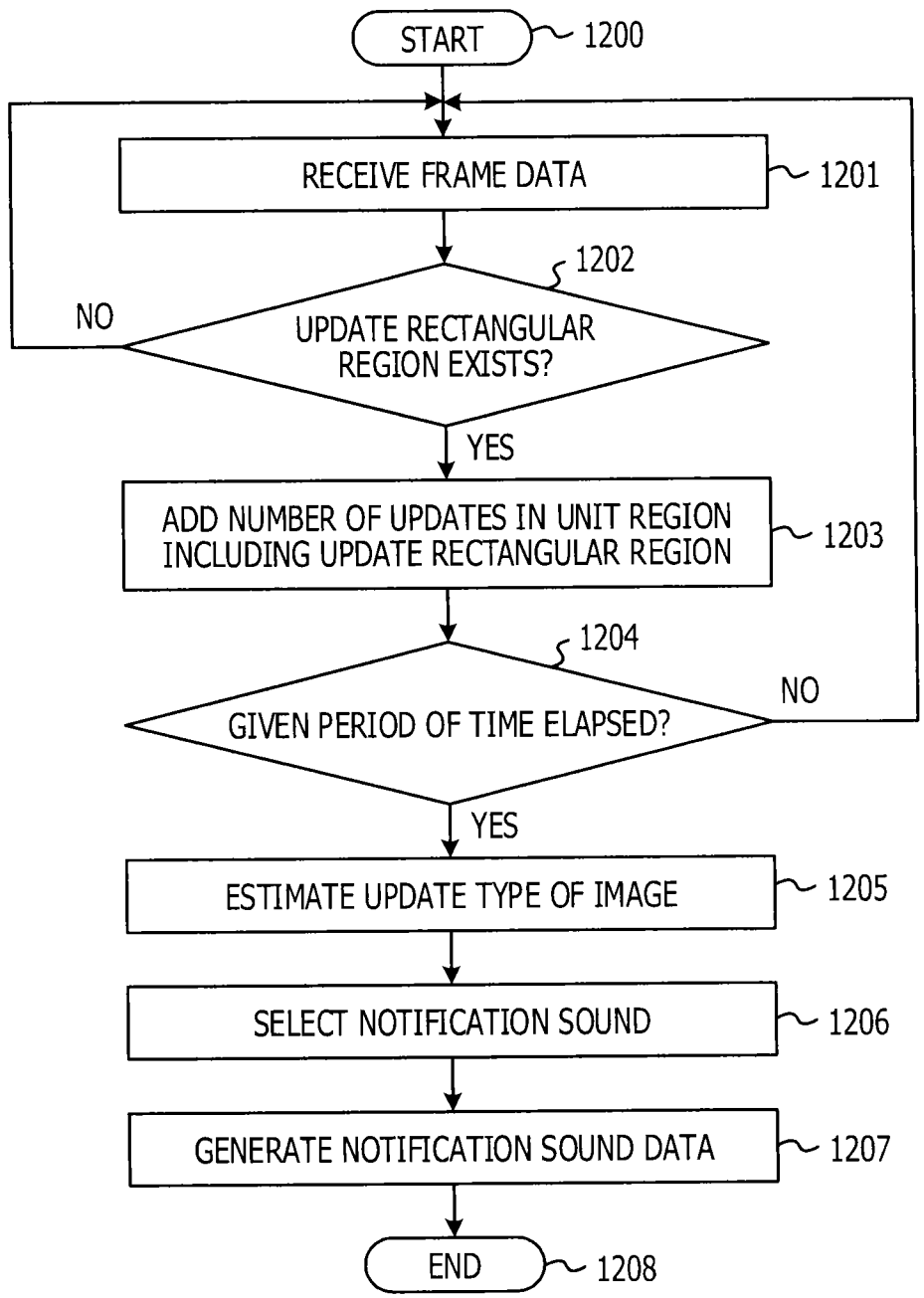
FIG. 8 is a processing flow chart of a processor relating to difference extraction and generation of notification sound data in the first embodiment.

FIG. 8 is a flow chart of processing relating to extraction of a difference between pieces of frame data and generation of notification sound data. Processing is started at step 1200. At step 1201, the frame buffer 116 receives new frame data. At step 1202, the difference extraction unit 117 extracts a difference between the frame data in the preceding cycle and the newly received frame data and determines whether or not an update rectangular region exists. If it is determined at step 1202 that an update rectangular region does not exist, then the processing returns to step 1201. Then, the processing is waited until next new frame data is stored into the frame buffer 116. If it is determined at step 1202 that an update rectangular region exists, then the processing advances to step 1203. At step 1203, in regard to a unit region that includes an overlap with an update rectangular region or update rectangular regions, the difference extraction unit 117 counts and adds the number of update rectangular regions including an overlap with the unit region. At step 1204, the difference extraction unit 117 determines whether or not a given period of time, for example one second, has elapsed. If it is determined at step 1204 that the given period of time has not elapsed, then the processing returns to step 1201. Then, steps 1201, 1202 and 1203 are repeated until the given period of time elapses. This given period of time is set suitably taking the accuracy in estimating the type of update of an image into consideration. For example, where the given period of time is short, the accumulated amount of data to be used for estimation is small, and therefore, it may be difficult to suitably decide the type of update. If the given period of time is long, image updates of a plurality of different types may occur within the given period of time, and therefore, it may be difficult to select suitable notification sound. Accordingly, taking the accuracy in estimating the type of update of an image into consideration, the given period of time is set, for example, to a "period of time in which data for 30 frames is to be acquired," or to "one second" or the like.

If it is determined at step 1204 that the given period of time has elapsed, then the processing advances to step 1205. At step 1205, the notification sound data generation unit 118 estimates the type of update of the image based on the result of the counting by the difference extraction unit 117. In particular, such a decision table as depicted in FIG. 7 is stored in advance, for example, in the volatile memory 130. Then, the notification sound data generation unit 118 refers to the decision table based on the counting result obtained at step 1203 to specify the type of update. At step 1206, the difference extraction unit 117 selects notification sound corresponding to the estimated type of update. At step 1207, the notification sound data generation unit 118 generates notification sound data corresponding to the selected notification sound and transmits the notification sound data to the sound data synthesis unit 121. Then, the processing ends at step 1208.

In this manner, in the first embodiment, when the user of the telephone terminal apparatus 100 uses the voice call function of the telephone terminal apparatus 100 and holds the telephone terminal apparatus 100 in the proximity of an ear, notification sound corresponding to the type of update based on update of the substance of the image displayed on the image display unit 165 is reproduced from the sound outputting unit 155 of the telephone terminal apparatus 100. Consequently, even when it is difficult for the user to visually observe the image display unit 165, the user can recognize, from the sound, update of the image displayed on the image display unit 165. The user who recognizes from the notification sound that the image substance has been updated can visually observe and recognize the display substance of the image display unit 165 with the telephone terminal apparatus 100 moved away from the ear once. Thus, the convenience of the telephone terminal apparatus 100 can be improved. The technology disclosed through the present embodiment exhibits its effects also in other cases than the case in which the user uses the voice call function of the telephone terminal apparatus 100. For example, also where the user holds the telephone terminal apparatus 100 in the proximity of an ear in order to hear music reproduced, for example, from the sound outputting unit 155 or sound other than voice call sound such as, for example, response sound, the user is notified of update of the image displayed on the image display unit 165 by sound.

Here, types of notification sound are additionally described. The notification sound may be any of machine sound and voice of a human speech. For example, where a display image for the notification of reception of a mail is popped up, the machine sound of "ping" may be used as the notification sound, or a voice "a mail has been received" may be used as the notification sound. For example, as the notification sound when a moving picture is reproduced, machine sound of "clack clack clack" generated when a projector operates may be used. Alternatively, a voice "a moving picture is being reproduced" may be used as the notification sound.

As the method of recognizing that an image is updated, the method of extracting a difference between pieces of frame data stored in the frame buffer 116 has been presented as an example. However, some other method may be used for recognizing update of an image. For example, a method of extracting a difference between contents such as text data to be displayed on the image display unit 165 so that it is estimated that an image to be displayed on the image display unit 165 is updated may be used.

[Second Embodiment]

Figure 9:
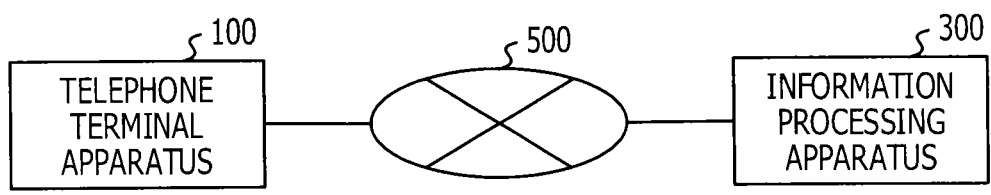
FIG. 9 is a block diagram depicting a configuration of a thin client system according to a second embodiment.

In a second embodiment, a thin client system that includes a telephone terminal apparatus and a server that receives an operation signal from the telephone terminal apparatus and transmits given image data or sound data to the telephone terminal apparatus is taken as an example, and a technique for notifying a user of the telephone terminal apparatus of a type of update of an image is described. FIG. 9 is a block diagram depicting a configuration of a thin client system. The telephone terminal apparatus depicted in FIG. 9 may be the telephone terminal apparatus 100 depicted in FIG. 1. As depicted in FIG. 9, the telephone terminal apparatus 100 is coupled to an information processing apparatus 300 such as a sever through a network 500. As the network 500, a communication network of an arbitrary type such as the Internet, a local area network (LAN) or a virtual private network (VPN) can be adopted irrespective of whether it is of the wire type or the wireless type.

The information processing apparatus 300 includes a function of providing a service for remotely controlling image data to be displayed on the telephone terminal apparatus 100 in response to an access thereto from the telephone terminal apparatus 100. In the thin client system, if an operation input from a user is performed for the telephone terminal apparatus 100, then the operation input is transmitted to the information processing apparatus 300 through the network 500. Then, the information processing apparatus 300 executes actual data processing in accordance with the operation input of the user. Then, the information processing apparatus 300 transmits a result of the processing and data held by the information processing apparatus 300 to the telephone terminal apparatus 100 through the network 500. The telephone terminal apparatus 100 causes the processing result and the data transmitted thereto from the information processing apparatus 300 to be displayed on the image display unit 165. Consequently, the user can use the telephone terminal apparatus 100 as if the telephone terminal apparatus 100 mainly executed data processing or retained data. As an example, the thin client system can cause the information processing apparatus 300 to execute an application relating to a work such as material preparation or a mail and cause the telephone terminal apparatus 100 to display a result of the processing of the application.

The second embodiment discloses a technology for notifying, when a user uses the voice call function in a state in which image data distributed from the information processing apparatus 300 is displayed on the telephone terminal apparatus 100 in the thin client system, the user by sound that the image substance has been updated. For example, a case is assumed that, in a state in which image data of given educational material is distributed from the information processing apparatus 300 to the telephone terminal apparatus 100 in an e-learning system, a user who is performing e-learning uses the voice call function to perform voice call. In this case, if a page of the educational material provided on the e-learning system is updated, then sound for the notification that a page has been updated is outputted from the sound outputting unit 155 of the telephone terminal apparatus 100.

Figure 10:
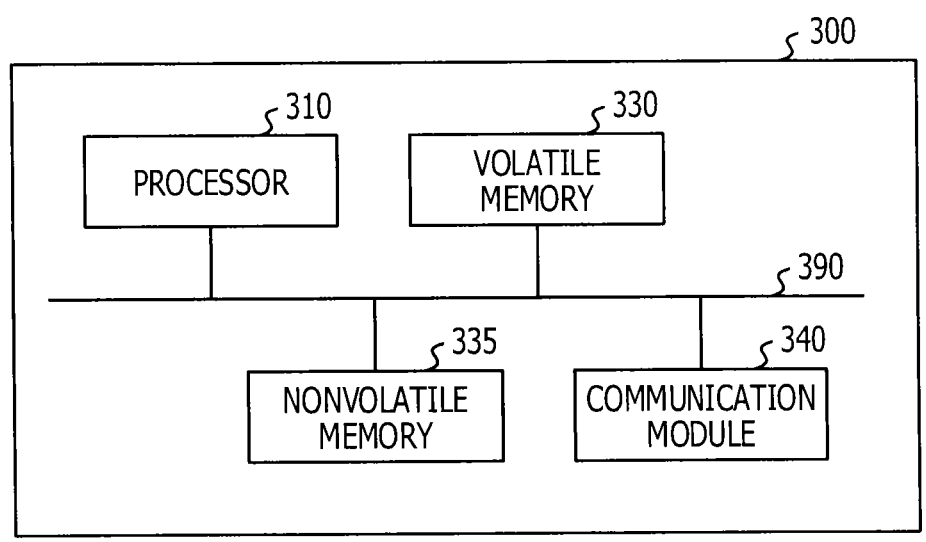
FIG. 10 is a block diagram depicting a hardware configuration of an information processing apparatus in the second embodiment.

FIG. 10 is a block diagram depicting a hardware configuration of an information processing apparatus. The information processing apparatus depicted in FIG. 10 may be the information processing apparatus 300 depicted in FIG. 9. The information processing apparatus 300 includes a processor 310, a volatile memory 330, a nonvolatile memory 335, a communication module 340, and a bus 390. The processor 310 performs control of the entire information processing apparatus 300 and a generation process of image data or a generation process of sound data based on an operation signal accepted from the telephone terminal apparatus 100 through the network 500. The processor 310 is an electronic circuit part such as a CPU, an MPU, a DSP or an FPGA. The volatile memory 330 stores data to be used by the processor 310 to perform processing. The volatile memory 330 may be used as a frame buffer configured to store display data produced by the processor 310. The volatile memory 330 is an electronic circuit part such as a DRAM or an SRAM. The nonvolatile memory 335 stores a computer program to be executed by the processor 310 and so forth. The nonvolatile memory 335 is a hard disc drive (HDD) or an electronic circuit part such as a mask ROM, a PROM or a flash memory. The communication module 340 controls data communication between the information processing apparatus 300 and the telephone terminal apparatus 100. The communication module 340 is, for example, a network interface card (NIC). The bus 390 interlinks the processor 310, volatile memory 330, nonvolatile memory 335 and communication module 340 and functions as a communication path for performing transmission and reception of data to and from one another.

Figure 11:
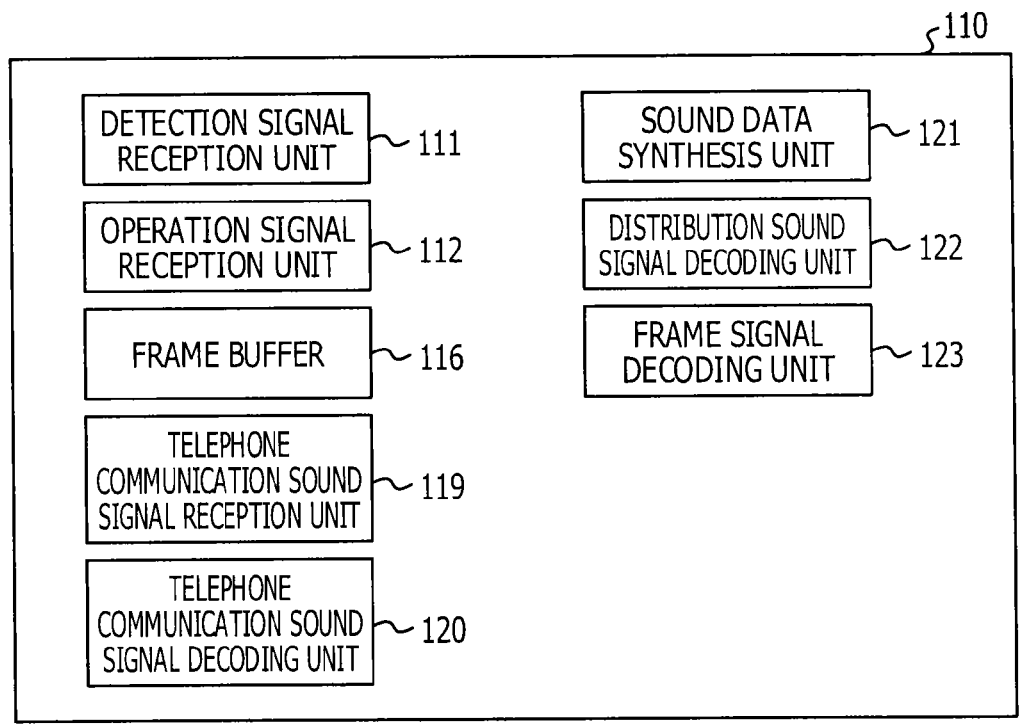
FIG. 11 is a functional block diagram of a processor of a telephone terminal apparatus in the second embodiment.

FIG. 11 is a functional block diagram of a processor of a telephone terminal apparatus according to the second embodiment. The telephone terminal apparatus described with reference to FIG. 11 may be the telephone terminal apparatus 100 depicted in FIG. 9. The processor depicted in FIG. 11 may be the processor 110 depicted in FIG. 2 with the exception described below. The processor 110 in the second embodiment executes a given computer program stored in the nonvolatile memory 135 or the like to implement the functions depicted in FIG. 11. The functional blocks including same contents as the contents of the functional blocks described hereinabove with reference to FIG. 3 are denoted same reference symbols in FIG. 11 and overlapping description is omitted herein suitably. The processor 110 in the second embodiment functions as the detection signal reception unit 111, the operation signal reception unit 112, the frame buffer 116, the voice call sound signal reception unit 119, the voice call sound signal decoding unit 120, the sound data synthesis unit 121, a distribution sound signal decoding unit 122 and a frame signal decoding unit 123. The detection signal reception unit 111 receives a detection signal from the proximity sensor 170. In the present embodiment, the detection signal received by the detection signal reception unit 111 is transferred to the information processing apparatus 300 through the communication module 140. The operation signal reception unit 112 receives an operation signal inputted to the telephone terminal apparatus 100 by the user. In the present embodiment, the operation signal received by the operation signal reception unit 112 is transferred to the information processing apparatus 300 through the communication module 140. This is because, in the thin client system, at least part of actual data processing is processed by the information processing apparatus 300.

The distribution sound signal decoding unit 122 receives sound data distributed from the information processing apparatus 300 in response to an operation signal transferred from the operation signal reception unit 112 through the communication module 140 and decodes the received sound data. As described later, the sound data distributed from the information processing apparatus 300 to the telephone terminal apparatus 100 is sound data obtained by synthesis of response sound data generated in response to an operation signal transmitted from the telephone terminal apparatus 100 and notification sound data generated in response to the type of update of the substance of an image. In the present embodiment, the sound data transmitted from the information processing apparatus 300 to the telephone terminal apparatus 100 is referred to as "distribution sound data." The frame signal decoding unit 123 receives an image signal distributed from the information processing apparatus 300 through the communication module 140 and decodes the received image signal. The decoded image data is stored into the frame buffer 116 and displayed on the image display unit 165.

Figure 12:
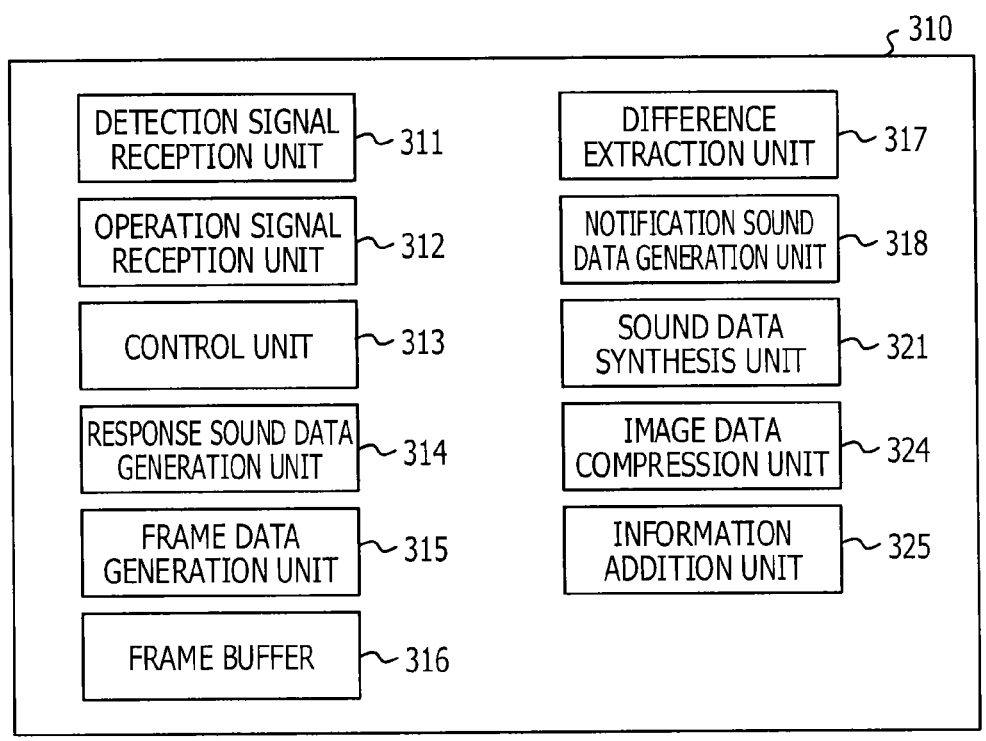
FIG. 12 is a functional block diagram of a processor of an information processing apparatus in the second embodiment.

FIG. 12 is a functional block diagram of a processor of an information processing apparatus. The processor and the information processing apparatus described with reference to FIG. 12 may be the processor 310 and the information processing apparatus 300 depicted in FIG. 10, respectively. The processor 310 executes a given computer program stored in the nonvolatile memory 335 or the like to implement functions depicted in FIG. 12. The processor 310 functions as a detection signal reception unit 311, an operation signal reception unit 312, a control unit 313, a response sound data generation unit 314, a frame data generation unit 315, and a frame buffer 316. The processor 310 further functions as a difference extraction unit 317, a notification sound data generation unit 318, a sound data synthesis unit 321, an image data compression unit 324 and an information addition unit 325. The detection signal reception unit 311 receives a detection signal transferred from the detection signal reception unit 111 of the telephone terminal apparatus 100 and used for the notification that the proximity sensor 170 detects a target through the network 500. The operation signal reception unit 312 receives an operation signal transferred from the operation signal reception unit 112 of the telephone terminal apparatus 100 and inputted to the telephone terminal apparatus 100 through the network 500.

The control unit 313 controls the response sound data generation unit 314 or the frame data generation unit 315 hereinafter described based on an operation signal received by the operation signal reception unit 312. Then, the control unit 313 generates, as a response to the operation signal, image data, sound data or the like to be displayed or reproduced by the telephone terminal apparatus 100. The control unit 313 determines based on reception of a detection signal that the telephone terminal apparatus 100 is held in the proximity of an ear of the user. Then, the control unit 313 performs control of the difference extraction unit 317 or the notification sound data generation unit 318 hereinafter described. The response sound data generation unit 314 generates sound response data to the telephone terminal apparatus 100, for example, sound data of the pulse code modulation (PCM) format, in accordance with an instruction from the control unit 313, and transmits the generated sound data to the sound data synthesis unit 321.

The frame data generation unit 315 generates frame data of an image to be displayed on the telephone terminal apparatus 100 in accordance with an instruction from the control unit 313. The frame data generated by the frame data generation unit 315 is stored into the frame buffer 316. The difference extraction unit 317 includes a data buffer. The difference extraction unit 317 acquires frame data (preceding frame data) inputted to the frame buffer 316. Then, the difference extraction unit 317 retains the acquired preceding frame data in the data buffer until frame data of a next frame (next frame data) is inputted to the frame buffer 316. The difference extraction unit 317 extracts a difference (differential) between the preceding frame data retained therein and the next frame data inputted to the frame buffer 316. In other words, the difference extraction unit 317 extracts data corresponding to a portion at which update of the display substance is found between one frame and a different frame that is to be displayed next to the one frame. The notification sound data generation unit 318 estimates the type of update of the image substance based on the difference extracted by the difference extraction unit 317. Then, the notification sound data generation unit 318 selects notification sound in response to a result of the estimation. The notification sound data generation unit 318 transmits the notification sound data corresponding to the selected notification sound to the sound data synthesis unit 321. The sound data synthesis unit 321 synthesizes the response sound data generated by the response sound data generation unit 314 and the notification sound data generated by the notification sound data generation unit 318. Then, the sound data synthesis unit 321 generates distribution sound data to be transmitted to the telephone terminal apparatus 100 by compression by a method such as, for example, moving picture experts group (MPEG)-1 audio layer-3 (MP3) or Ogg Vorbis (registered trademark).

The image data compression unit 324 compresses the difference data extracted by the difference extraction unit 317 using an image compression code such as, for example, joint photographic experts group (JPEG) or portable network graphics (PNG) to generate compression image data to be transmitted to the telephone terminal apparatus 100. The information addition unit 325 generates additional information to be used for decoding such as, for example, a frame number. Then, the information addition unit 325 adds the generated additional information to the compression image data generated by the image data compression unit 324 as a header or the like to generate a transmission packet. The information addition unit 325 adds suitable additional information also to the distribution sound data generated by the sound data synthesis unit 321 to generate a transmission packet. It is not necessary to implement all of the functional blocks depicted in FIG. 12 by the processor 310. For example, the frame buffer 316 may be implemented using the volatile memory 330 that is an external device to the processor 310.

Figure 13:
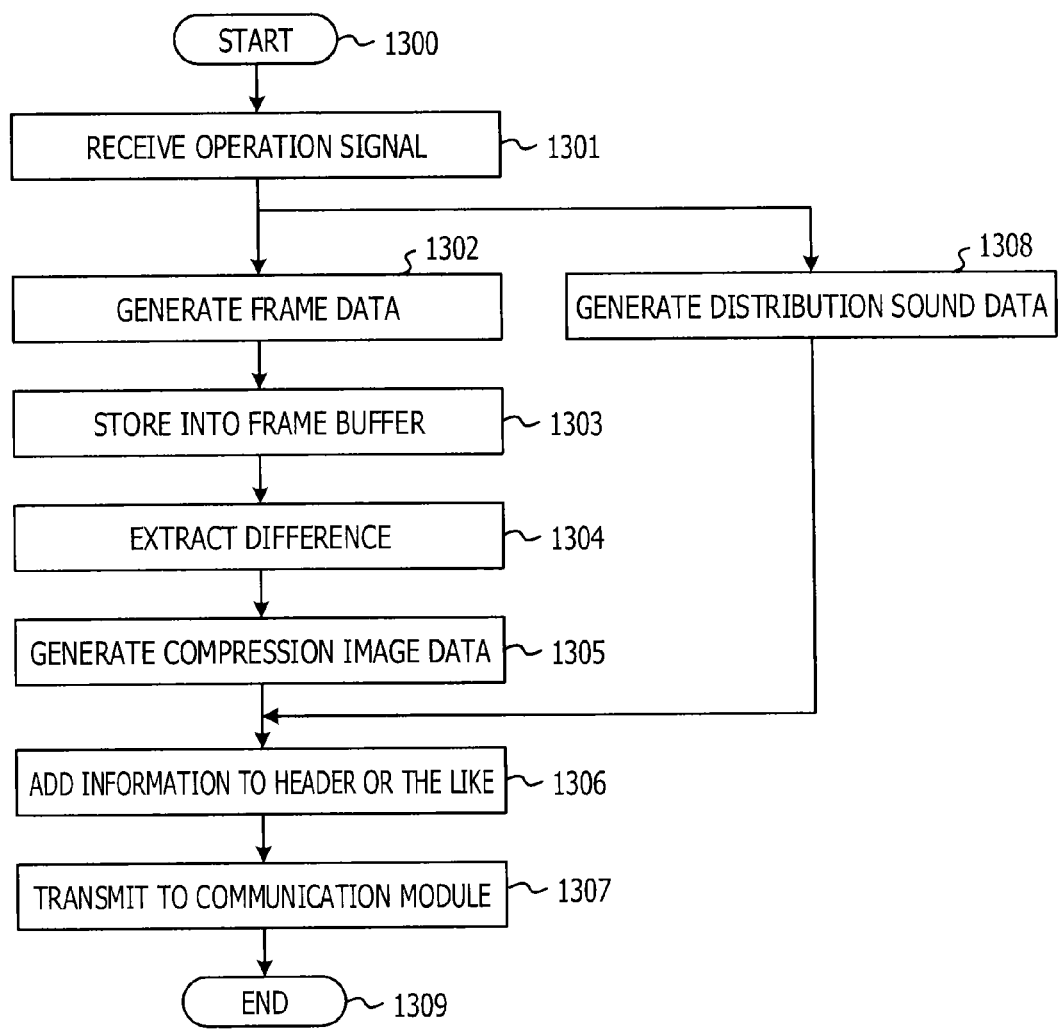
FIG. 13 is a processing flow chart of a processor of an information processing apparatus in the second embodiment when an operation signal is received.

FIG. 13 is a processing flow chart of a processor when an information processing apparatus receives an operation signal from a telephone terminal apparatus. The processor, the information processing apparatus and the telephone terminal apparatus described with reference to FIG. 13 may be the processor 310 depicted in FIG. 10, the information processing apparatus 300 and the telephone terminal apparatus 100 depicted in FIG. 9, respectively. Processing is started at step 1300. At step 1301, the operation signal reception unit 312 receives an operation signal from the telephone terminal apparatus 100 through the network 500. At step 1302, the frame data generation unit 315 generates frame data to be displayed on the image display unit 165 of the telephone terminal apparatus 100 in response to the substance of the operation signal. At step 1303, the frame buffer 316 stores the generated frame data. At step 1304, the difference extraction unit 317 extracts, from the frame data stored in the frame buffer 316, data of a portion at which the substance of the frame data is different from the substance of the frame data in the preceding cycle. At step 1305, the image data compression unit 324 compresses the extracted data at the different portion to generate compression image data. By extracting and compressing data at a portion at which the substance of the frame data is different from the substance of the frame data in the preceding cycle in this manner, the amount of data to be transmitted from the information processing apparatus 300 to the telephone terminal apparatus 100 can be reduced. At step 1306, the information addition unit 325 adds, to the generated compression image data, additional information to be used for data transmission to the telephone terminal apparatus 100 and reproduction of the image data by the telephone terminal apparatus 100, for example, as a header of a transmission packet. At step 1307, the information addition unit 325 transmits the generated compression image data to the communication module 340, and the processing is ended at step 1309. Thereafter, the communication module 340 transmits the generated compression image data to the telephone terminal apparatus 100 through the network 500.

Where the data generated based on an operation signal and transmitted to the telephone terminal apparatus 100 includes sound data in addition to image data, after step 1301, the response sound data generation unit 314 generates response sound data at step 1308. Also to the response sound data generated at step 1308, in step 1306, the information addition unit 325 adds additional information to be used for data transmission to the telephone terminal apparatus 100 and reproduction of the response sound data by the telephone terminal apparatus 100, for example, as a header of a transmission packet.

Figure 14:
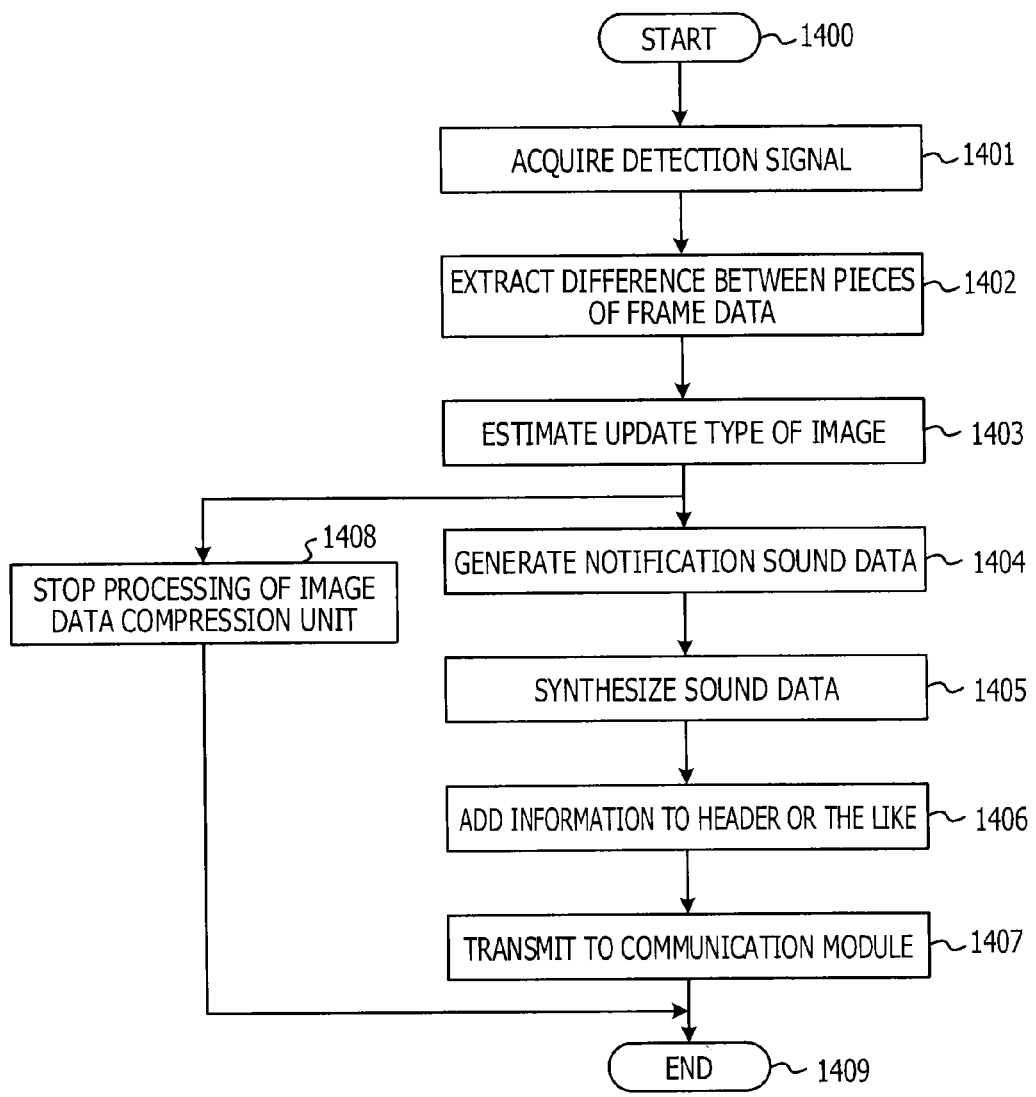
FIG. 14 is a processing flow chart of a processor of an information processing apparatus in the second embodiment when a detection signal is received.

FIG. 14 is a processing flow chart performed by a processor when a detection signal transmitted from a telephone terminal apparatus is received by an information processing apparatus. The processor, the telephone terminal apparatus and the information processing apparatus described with reference to FIG. 14 may be the processor 310 depicted in FIG. 10, the telephone terminal apparatus 100 and the information processing apparatus 300 depicted in FIG. 9, respectively. Processing is started at step 1400. At step 1401, the detection signal reception unit 311 receives a detection signal transmitted thereto from the telephone terminal apparatus 100. Consequently, the processor 310 recognizes that the user is using the voice call function of the telephone terminal apparatus 100. At step 1402, the difference extraction unit 317 extracts a difference between the frame data stored in the frame buffer 316 and the frame data retained by the difference extraction unit 317. At step 1403, the notification sound data generation unit 318 estimates the type of update of the image substance based on the difference between the pieces of frame data extracted by the difference extraction unit 317. At step 1404, the notification sound data generation unit 318 selects notification sound to be used for the notification of the type of update to the user in response to the estimated type of update of the image substance to generate notification sound data. At step 1405, the sound data synthesis unit 321 synthesizes (mixes) the response sound data generated by the response sound data generation unit 314 and the notification sound data generated by the notification sound data generation unit 318 to generate distribution sound data. At step 1406, the information addition unit 325 adds, to the generated distribution sound data, additional information to be used for the transmission to the telephone terminal apparatus 100 and reproduction by the telephone terminal apparatus 100 to generate a transmission packet. At step 1407, the communication module 340 transmits the generated transmission packet to the telephone terminal apparatus 100 through the network 500. The processing is ended at step 1409.

At step 1408, the control unit 313 may control the image data compression unit 324 to stop the processing thereby to stop the generation of compression image data. It is considered that, in a state in which a detection signal is transmitted from the telephone terminal apparatus 100, it may be difficult for the user to see the image display unit 165. Therefore, by stopping the compression process of image data so that transmission of image data is not performed, the transmission load to the communication module 340 and the communication load to the network 500 can be reduced. Also in the telephone terminal apparatus 100, it is possible to reduce the power consumption of the telephone terminal apparatus 100 by stopping the process relating to display.

By performing, in a state in which a detection signal is being transmitted from the telephone terminal apparatus 100, a process for reducing the transmission frequency of compression image data from the information processing apparatus 300 to the telephone terminal apparatus 100, the transmission load to the communication module 340 and the communication load to the network 500 can be reduced. In this case, the control unit 313 performs control to the communication module 340 of reducing, based on the fact that the detection signal reception unit 311 receives the detection signal, the transmission frequency of compression image data, for example, from 30 times per second during normal operation to five times per second. Where update of 30 frames is performed for one second, if the transmission frequency is reduced to five times per second, then difference data for six frames are compressed and transmitted by single time transmission.

The substance of the flow chart of the process relating to difference extraction between pieces of frame data and generation of notification sound data in the second embodiment is same as that depicted in FIG. 8, and illustration and description are omitted here. However, as regards the main processing constituents of the processes, it is assumed that the following replacement of terms is performed for the description given with reference to FIG. 8. In particular, "frame buffer 116" is read as "frame buffer 316"; "difference extraction unit 117" as "difference extraction unit 317"; and "notification sound data generation unit 118" as "notification sound data generation unit 318."

In this manner, in the second embodiment, the information processing that makes use of a thin client system is taken as an example and described. Also with the second embodiment, in a state in which the user is using the voice call function of the telephone terminal apparatus 100, the convenience to the user, when it is difficult for the user to see the image display unit 165, can be improved by notifying, the user by sound that the image substance is updated similarly as in the first embodiment.

[Third Embodiment]

Figure 15:
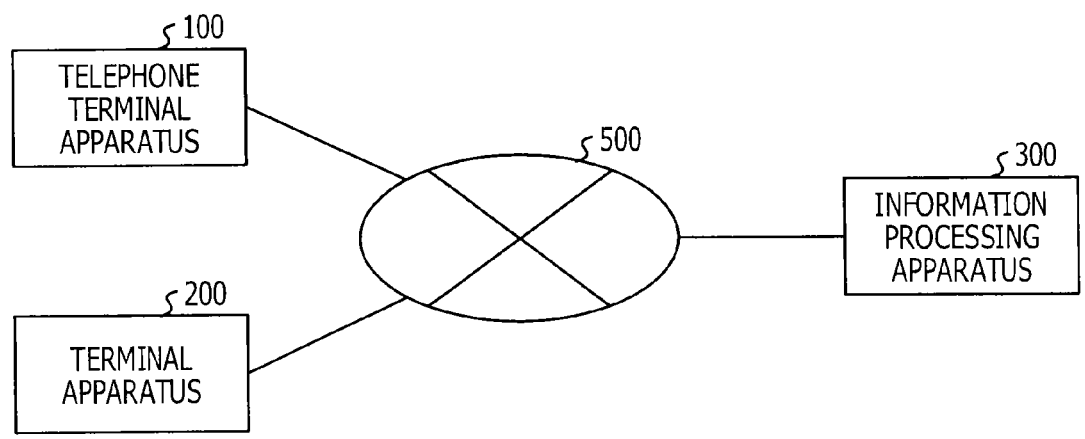
FIG. 15 is a block diagram depicting a configuration of a thin client system according to a third embodiment.

Now, a third embodiment that assumes a scene in which a plurality of users perform a collaboration work using a thin client system is described. FIG. 15 depicts a thin client system in which a telephone terminal apparatus and a terminal apparatus are coupled to an information processing apparatus through a network. The telephone terminal apparatus, the information processing apparatus and the network depicted in FIG. 15 may be the telephone terminal apparatus 100, the information processing apparatus 300 and the network 500 depicted in FIG. 9. To a terminal apparatus 200, a telephone terminal apparatus such as a smartphone or some other portable telephone terminal apparatus, a tablet type PC, a PDA and so forth can be applied similarly to the telephone terminal apparatus 100. In the present embodiment, the terminal apparatus 200 need not include the voice call function.

Referring to FIG. 15, it is assumed that the telephone terminal apparatus 100 and the terminal apparatus 200 access a common source of the information processing apparatus 300 through the network 500. It is assumed that the telephone terminal apparatus 100 and the terminal apparatus 200 cause respective image display units to display common image data provided from the information processing apparatus 300. It is assumed that a user of the telephone terminal apparatus 100 and a user of the terminal apparatus 200 can individually input data, a comment or the like to the common source of the information processing apparatus 300. It is assumed that, in such a scene as just described, the user of the telephone terminal apparatus 100 uses the voice call function of the telephone terminal apparatus 100 in order to ask a question or make a discussion regarding the substance of the common source of the information processing apparatus 300 by voice communication with the user of the terminal apparatus 200. Then, it is assumed that the user of the terminal apparatus 200 uses a keyboard or a mouse of the terminal apparatus 200 to perform inputting in order to input some information to the common source in regard to a comment from the telephone terminal apparatus 100 during voice call with the user of the telephone terminal apparatus 100. In this case, the display substance of the common source of the information processing apparatus 300 is updated in response to the input by the user of the terminal apparatus 200. However, the user of the telephone terminal apparatus 100 uses the telephone terminal apparatus 100 as a communication unit and it may be difficult for the user of the telephone terminal apparatus 100 to see the image display unit 165 of the telephone terminal apparatus 100. Therefore, it may be difficult for the user of the telephone terminal apparatus 100 to recognize what information has been written into the common source from the user of the terminal apparatus 200 or in what manner the display of the common source of the information processing apparatus 300 has been updated with the information.

In the present embodiment, when the user of the telephone terminal apparatus 100 and the user of the terminal apparatus 200 perform a collaboration work through the information processing apparatus 300, each user can recognize an inputting situation (operation situation of the terminal apparatus) of the opponent so that the collaboration work can be performed with a higher degree of smoothness. In the present embodiment, when an inputting operation of a keyboard or a mouse is performed for the terminal apparatus 200, an operation signal is transmitted to the information processing apparatus 300. The operation signal includes operation information indicative of what inputting operation is performed by the user of the terminal apparatus 200. The operation information includes, for example, a keyboard input, a mouse movement, a mouse wheel turning, a mouse drag and so forth. The information processing apparatus 300 selects notification sound based on the received operation information and a difference between pieces of frame data described hereinabove in connection with the second embodiment. For example, if there is an input from the user of the terminal apparatus 200 as a result of a keyboard operation and the display image is updated, then the information processing apparatus 300 selects, for example, the sound "click clack" generated when a keyboard is operated as the notification sound and transmits the selected sound to the telephone terminal apparatus 100. Consequently, the user of the telephone terminal apparatus 100 can recognize by sound that the opponent of the collaboration work is performing some information inputting to the common source by a keyboard operation. Therefore, the user of the telephone terminal apparatus 100 can confirm the display unit by visual observation as occasion commands and can therefore perform the collaboration work with a higher degree of efficiency. In the present embodiment, the operation signal reception unit 312 of the information processing apparatus 300 records the operation signal received from the terminal apparatus 200 and retains the operation signal for a fixed period of time. Then, when trying to select notification sound, the notification sound data generation unit 318 refers not only to the difference between pieces of frame data extracted by the difference extraction unit 317 but also the operation information received from the terminal apparatus 200 and selects appropriate notification sound.

Figure 16:
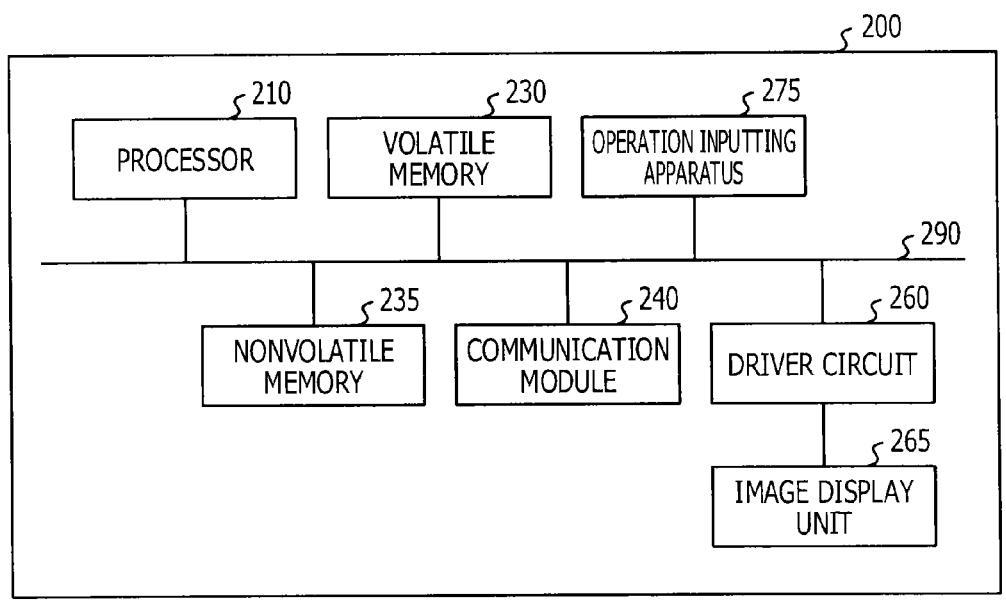
FIG. 16 is a block diagram depicting a hardware configuration of a terminal apparatus in the third embodiment.

FIG. 16 is a block diagram of a hardware configuration of a terminal apparatus. The terminal apparatus depicted in FIG. 16 may be the terminal apparatus 200 depicted in FIG. 15. The terminal apparatus 200 may be a telephone terminal apparatus having a configuration similar to the configuration of the telephone terminal apparatus 100. However, it is not necessary for the terminal apparatus 200 itself to include the voice call function, and therefore, no communication detection unit is required. Therefore, in the present embodiment, an example in which the terminal apparatus 200 is a PC is described. The terminal apparatus 200 includes a processor 210, a volatile memory 230, a nonvolatile memory 235, a communication module 240, a driver circuit 260, an image display unit 265, an operation inputting apparatus 275 and a bus 290.

The processor 210 performs control of the entire terminal apparatus 200 and processing relating to image data and sound data and so forth. The processor 210 is an electronic circuit part such as a CPU, an MPU, a DSP or an FPGA. The volatile memory 230 stores data and so forth to be used by the processor 210 to perform processing. The volatile memory 230 is an electronic circuit part such as a DRAM or an SRAM. The nonvolatile memory 235 stores a program to be executed by the processor 210 and so forth. The nonvolatile memory 235 is an electronic circuit part such as a mask ROM, a PROM or a flash memory. The communication module 240 performs data communication with the telephone terminal apparatus 100 or the information processing apparatus 300. The driver circuit 260 is a driver circuit configured to output frame data stored in the volatile memory 230 or the like to the image display unit 265. The image display unit 265 is a display device configured to display frame data received from the driver circuit 260. The bus 290 interlinks the circuits of the processor 210 and the volatile memory 230 and so forth and functions as a path for data transmission between the circuits. The operation inputting apparatus 275 is an inputting apparatus such as a keyboard or a mouse.

If the user of the terminal apparatus 200 performs inputting using the operation inputting apparatus 275 such as a keyboard or a mouse, the input is transmitted as an operation signal to the information processing apparatus 300 through the network 500. The operation signal is received by the operation signal reception unit 312. The operation signal reception unit 312 records the operation information included in the operation signal and retains the operation information for a fixed period of time. The notification sound data generation unit 318 selects notification sound based on the operation information recorded in the operation signal reception unit 312 in addition to an extracted difference between pieces of frame data stored in the frame buffer 316.

FIG. 17 is a diagram depicting an estimation method of an update type of an image and depicting an example of conditions to be used when a notification sound data generation unit selects notification sound. The notification sound data generation unit described with reference to FIG. 17 may be the notification sound data generation unit 318 depicted in FIG. 12. For example, the first column indicates that, if the number of unit regions in which the accumulated count number within a given period of time is equal to or greater than 2 is 200 or more and besides the recorded operation information represents a mouse drag operation or a mouse wheel operation, then it is determined that the update of the image substance arises from a browse operation. Then, notification sound corresponding to the browse operation is selected. The second column indicates that, if the number of unit regions in which the accumulated count number within the given period of time is equal to or greater than 1 is equal to or greater than 1 and equal to or smaller than 3 and besides the operation information represents a keyboard operation, then it is determined that the update of the image substance is update of a text. Then, notification sound corresponding to update of a text is selected.

The substance of the flow chart of the process relating to difference extraction between pieces of frame data and generation of notification sound data in the third embodiment is same as the substance depicted in FIG. 8, and illustration and description are omitted here. However, as regards the main processing constituents of the processes, it is assumed that the following replacement of terms is performed in the description given with reference to FIG. 8. In particular, "frame buffer 116" is read as "frame buffer 316"; "difference extraction unit 117" as "difference extraction unit 317"; and "notification sound data generation unit 118" as "notification sound data generation unit 318." Further, as regards step 1205, the description given hereinabove with reference to FIG. 8 is read such that the notification sound data generation unit 318 estimates the type of update of an image based on a counting result of the difference extraction unit 317 and operation information recorded in the operation signal reception unit 312.

In this manner, in the third embodiment, when a collaboration work is performed by a plurality of users who utilize the thin client system, a user who is holding the telephone terminal apparatus 100 applied to an ear is notified of notification sound selected based on information relating to update of frame data and an inputting operation of an opponent user. Consequently, the collaboration work can be performed with a higher degree of smoothness.

While the first to third embodiments have been described, the present technology is not limited to the application examples disclosed in connection with the first to third embodiments. For example, as a mechanism that notifies a user of updating of an image, an example wherein sound corresponding to the type of update is outputted from the sound outputting unit 155 of the telephone terminal apparatus 100 is described. However, the notification mechanism may be some other alternative mechanism or may include an additional mechanism. For example, a vibration function of the telephone terminal apparatus 100 may be used such that, when an image is updated, a vibration action is executed to notify the user of updating of the image. In this case, by suitably selecting the period of time for which the telephone terminal apparatus 100 is to vibrate or by suitably selecting, when the telephone terminal apparatus 100 is caused to vibrate intermittently, the interval between the vibration actions or the like, the user is permitted to distinguish the type of update of the image.

In a collaboration work in which a thin client system is used, if operation information inputted from a different terminal apparatus is text data from a keyboard, then the inputted text data may be converted into sound and outputted from the sound outputting unit 155 of the telephone terminal apparatus 100 in addition to or in place of the sound for the notification of the type of update of the image. The user of the telephone terminal apparatus 100 can thereby recognize an input of the user of the terminal apparatus 200, who is the opponent of the collaboration work, with a high degree of particularity and accuracy, and consequently, the collaboration work can be proceeded efficiently. In conversion of text data into sound, for example, a method can be applied that a sound conversion application is downloaded into the telephone terminal apparatus 100 such that the processor 110 executes the sound conversion application in response to reception of a detection signal by the detection signal reception unit 111 to convert the inputted text data into sound.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method executed by a processor included in an information processing apparatus that includes a display device that displays an image and a speaker, the information processing method comprising:
   selecting, when an update of an image displayed on a display of the display device is detected while the information processing apparatus is in a state of a voice call, a notification sound based on a type of the update; and
   outputting the selected notification sound from the speaker.

2. The information processing method according to claim 1, further comprising
   generating frame data of an image corresponding to the operation signal and storing the generated frame data into a memory, every time an operation signal for operating the information processing apparatus is received,
   wherein the selecting the notification sound includes:
      extracting a difference between two pieces of frame data, which are frame data before the update and frame data after the update, stored in the memory; and
      selecting notification sound corresponding to the extracted difference.

3. The information processing method according to claim 2, further comprising:
   extracting a plurality of update regions each indicative of a region in which a display substance is different between the two pieces of frame data;
   acquiring, from each of a plurality of unit regions obtained by dividing each frame data at a given distance, a count number corresponding to the two pieces of frame data by counting the number of the update regions included in the unit region;
   repeating the counting within a given period of time; and
   acquiring a cumulative value of the count number for each of the plurality of unit regions by calculating a total of the count numbers acquired by the repeating, and
   wherein the selecting of the notification sound includes:
      specifying a type of the update based on the cumulative value, and
      selecting a notification sound corresponding to the specified type.

4. The information processing method according to claim 3, wherein the acquiring of the count number includes:
    acquiring the count number using a map in which the plurality of unit regions obtained by dividing the frame data in a mesh form are arranged.

5. The information processing method according to claim 1, further comprising:
    controlling so that an image is not displayed on the display of the display device when it is detected that the information processing apparatus is being used as a telephone apparatus.

6. The information processing method according to claim 5, wherein the controlling includes stopping power supply to the display device.

7. The information processing method according to claim 5, wherein the controlling includes reducing an illuminance of a backlight provided in the display device.

8. The information processing method according to claim 1, further comprising:
    detecting that the information processing apparatus is being used as a telephone apparatus by a proximity sensor provided on the information processing apparatus.

9. The information processing method according to claim 1, wherein the outputting includes outputting voice call sound in an overlapping relationship with the notification sound.

10. An information processing apparatus, comprising:
    a display device;
    a speaker; and
    a processor coupled to the display device and the speaker and configured to:
        select, when an update of an image displayed on a display of the display device is detected while the information processing apparatus is in a state of a voice call, a notification sound based on a type of the update; and
        output the selected notification sound from the speaker.

11. The information processing apparatus according to claim 10, wherein the processor is further configured to:
    generate frame data of an image corresponding to the operation signal and storing the generated frame data into a memory, every time an operation signal for operating the information processing apparatus is received;
    extract a difference between two pieces of frame data, which are frame data before the update and frame data after the update, stored in the memory; and
    select a notification sound corresponding to the extracted difference.

12. The information processing apparatus according to claim 11, wherein the processor is configured to:
    extract a plurality of update regions each indicative of a region in which a display substance is different between the two pieces of frame data;
    acquire, from each of a plurality of unit regions obtained by dividing each frame data at a given distance, a count number corresponding to the two pieces of frame data by counting the number of the update regions included in the unit region;
    repeat the counting within a given period of time;
    acquire a cumulative value of the count number for each of the plurality of unit regions by calculating a total of the count numbers acquired by repeating the counting;
    specify a type of the update based on the cumulative value; and
    select notification sound corresponding to the specified type.

13. The information processing apparatus according to claim 12, wherein the processor is configured to:
    acquire the count number using a map in which the plurality of unit regions obtained by dividing the frame data in a mesh form are arranged.

14. An information processing system, comprising:
    a first information processing apparatus including a display device and a speaker; and
    a second information processing apparatus that transmits an image to be displayed on the display device to the first information processing apparatus,
    wherein the first information processing apparatus is configured to:
        select, when an update of an image displayed on a display of the display device is detected while the information processing apparatus is in a state of a voice call, a notification sound based on a type of the update; and
        output the selected notification sound from the speaker.

* * * * *